United States Patent [19]

Itoh et al.

[11] 4,218,308

[45] Aug. 19, 1980

[54] HYDROGENATION CATALYST

[75] Inventors: Takuji Itoh, Sayama; Ikuo Akitsuki, Ohi, both of Japan

[73] Assignee: Toa Nenryo Kogyo Kabushiki Kaisha, Tokyo, Japan

[21] Appl. No.: 7,140

[22] Filed: Jan. 29, 1979

Related U.S. Application Data

[60] Continuation of Ser. No. 690,265, May 26, 1976, abandoned, which is a division of Ser. No. 607,091, Aug. 22, 1975, abandoned.

[51] Int. Cl.$^2$ ............................................... C10G 23/04
[52] U.S. Cl. .................................. 208/143; 252/455 R
[58] Field of Search ...................... 208/143; 252/455 R

[56] References Cited

U.S. PATENT DOCUMENTS

| | | | |
|---|---|---|---|
| 3,770,618 | 11/1973 | Adams et al. | 208/216 |
| 3,803,027 | 4/1974 | Christman et al. | 208/216 |
| 3,836,453 | 9/1974 | Kovach et al. | 208/143 |
| 3,900,427 | 8/1975 | Riley et al. | 252/455 R |

*Primary Examiner*—Herbert Levine
*Attorney, Agent, or Firm*—Edward M. Corcoran

[57] ABSTRACT

Novel catalyst compositions are provided comprising a silica/alumina carrier having a silica content less than about 40% by weight and at least one noble metal component of Group VIII of the Periodic Table and wherein the catalyst contains (1) pores having a diameter of smaller than 600 Å occupying at least 90% of the total pore volume and (2) pores having a diameter of 150 to 600 Å occupying at least about 40% of the total volume of the pores having a diameter of smaller than 600 Å. This catalyst is particularly useful in the production of jet fuels and white oils.

8 Claims, No Drawings

HYDROGENATION CATALYST

This is a continuation of application Ser. No. 690,265, filed May 26, 1976 which, in turn, is a divisional of application Ser. No. 607,091 filed August 22, 1975 both now abandoned.

BACKGROUND OF THE INVENTION

1. Field of the Invention

This invention relates to a catalyst for hydrogenating hydrocarbon oils. More particularly, this invention relates to a catalyst for the hydrogenation of hydrocarbon oils containing aromatic compounds. Still more particularly, this invention relates to a noble metal catalyst having a novel pore structure which exhibits a high activity for the hydrogenation of aromatic compounds in hydrocarbon oils and finds particular use in the production of jet fuel, kerosene and white oils.

2. Description of the Prior Art

Aromatic hydrocarbons contained in middle fractions such as jet fuel, kerosene and solvents, reduce their combustion characteristics as evaluated by the smoke point, the luminometer number and the wick-chair weight and also degrade the quality of middle distillate products. Especially in the case of white oils for industrial and pharmaceutical uses, a high quality hydrocarbon oil is required. Therefore, the presence of even minute amounts of aromatic hydrocarbons is not allowed. Further, lubricating oil fractions containing aromatic hydrocarbons are inferior in quality because the aromatics contribute to a low viscosity index and a high ultraviolet absorption.

Accordingly, hydrogenation is generally conducted for removing aromatic hydrocarbons contained in hydrocarbon oils such as middle fractions and lubricating oil fractions. Aromatic hydrocarbons are either converted to naphthenic hydrocarbons by aromatic nuclear saturation caused by hydrogenation carried out under considerably severe reaction conditions or they are hydrocracked to paraffinic hydrocarbons by such hydrogenation. In such hydrogenation it is necessary that only aromatic hydrocarbons be selectively converted. Some catalysts meeting this requirement have already been proposed, such as i.e., a catalyst composed of a noble metal of group VIII of the Periodic Table such as platinum and palladium, a catalyst containing a metal of group VIII of the Periodic Table and an oxide and/or sulfide of a metal of group VI of the Periodic Table, and a catalyst composed of reduced nickel.

In solid catalysts used in chemical reactions, the pore structure of the catalyst is very important, because it is instrumental in controlling the reaction site, and activity. More specifically, in solid catalysts, it is indispensable that (1) the catalytic reaction activity per unit volume should be high, (2) reactants should easily be transferred to active points. (3) the catalyst life should be long, and further, (4) the mechanical strength should be high enough to resist conditions in industrial applications. The pore structure significantly influences these properties required of catalysts.

However, the catalysts known in the prior art are defective in that either their activity for hydrogenating aromatic compounds is insufficient or they are readily poisoned by sulfur compounds contained in the hydrocarbon oils.

SUMMARY OF THE INVENTION

The present invention provides a novel catalyst composition for the hydrogenation of hydrocarbon oils which comprises a silica/alumina carrier having a silica content of less than about 40 weight %, at least one noble metal component of group VIII of the Periodic Table supported on said carrier, and being further characterized by (1) pores having a diameter smaller than 600 Å occupying at least 90% of the total pore volume and (2) pores having a diameter of 150 to 600 Å occupying at least about 40% of the total volume of the pores having a diameter smaller than 600 Å. This catalyst is further characterized in that it has a specific surface area of at least about 200 m$^2$/g and a bulk density of less than about 0.6 g/ml.

The catalyst composition of the instant invention provides (1) a high catalytic reaction activity per unit volume, (2) easy transfer of reactants to active points, (3) relatively long catalyst life, and further (4) a mechanical strength high enough to resist conditions in industrial applications.

The hydrogenation catalyst of this invention is characterized in that pores having a diameter of 150 to 600 Å occupying at least about 40%, preferably at least 50%, more preferably 50 to 80%, of the total volume of pores having a diameter of smaller than 600 Å. In short, the proportion of pores having a diameter smaller than 150 Å is relatively low (an especially preferable proportion is 60 to 20%). As is apparent from Examples described hereinafter, the catalyst of this invention has a very high activity and exhibits a conspicuous reduction in the ultraviolet absorbance of oils treated therewith, indicating the relatively high degree to which aromatic hydrocarbons are removed by the use of this catalyst. Further, the catalyst of this invention can control sludge formation.

It has been discovered that pores having a diameter smaller than 150 Å, especially smaller than 60 Å, have the effect of increasing the number of active sites of the catalyst, but when coke is formed on the catalyst they are readily clogged thereby causing a reduction in the activity. It has also been found that in a catalyst which does not contain pores having a diameter of from 150 to 600 Å or if such pores occupy less than about 40% of the total pore volume of pores having a diameter of less than 600 Å, both the activity and the activity maintenance are insufficient and that the intended objects of this invention cannot be attained by the use of such a catalyst.

As previously mentioned supra, when a catalyst is used on an industrial scale it should have a high mechanical strength. Accordingly, therefore, it has been found that the volume of the pores having a diameter larger than 600 Å has a close relation to the mechanical strength of the catalyst. More specifically, in the case of a catalyst comprising, as a carrier, an extrusion-molded silica/alumina having a diameter of 1.5 mm and wherein the volume of pores having a diameter larger than 600 Å is more than 10% of the total pore volume, it is difficult to maintain a side crushing strength higher than about 1.0 Kg/nm. Further, a catalyst having pores of a diameter larger than 600 Å is disadvantageous, in view of the catalytic activity, because the number of active sites per unit volume is decreased.

Accordingly therefore, in the catalyst of this invention it is indispensable for pores having a diameter of less than 600 Å to occupy the majority of the total pore volume. More specifically, it is necessary that the volume of pores having a diameter of less than 600 Å should be at least about 90%, preferably at least about 95%, of the total pore volume.

The catalyst of this invention is further characterized in that it has a bulk density of less than about 0.6 g/ml. If the bulk density is higher than about 0.6 g/ml, it is difficult to attain the most characteristic feature of this invention, namely, to increase the proportion of pores having a diameter of 150 to 600 Å. If the bulk density is less than about 0.6 g/ml. as mentioned above, a catalyst having the desired pore distribution can be obtained.

In order to increase number of the active sites, it is desirable to increase the surface area. However, increasing the surface area naturally results in an increase of the proportion of pores having a smaller diameter. Since smaller diameter pores are clogged by coke formed during the reaction, the catalytic activity is thereby lowered. In the catalyst of the instant invention, it is necessary for the specific surface area to be at least about 200 m$^2$/g and preferably from about 200 to about 400 m$^2$/g.

The silica content of the silica/alumina carrier used in the catalyst of this invention should be less than about 40% by weight and preferably from about 5 to about 40% by weight. When the silica content is within this range, maintenance of the heretofore mentioned specific pore structure, specific surface area and bulk density can be easily facilitated. Since a carrier having a silica content higher than about 40% by weight imparts a high cracking activity to the catalyst, the use of a catalyst comprising a carrier of such a high silica content is not preferred for the hydrogenation of hydrocarbon oils containing aromatic and unsaturated hydrocarbons, because it reduces the viscosity of the oils. The physical properties of hydrocarbon oils treated by the catalyst are not adversely affected only when a carrier having a silica content of less than about 40% by weight is employed and the catalyst can also be used for a long time because of its improved resistance to sulfur poisoning. The carrier may also contain a small amount (i.e., from about 1 to about 10 weight %) of other refractory inorganic oxides such as magnesia, zirconia, titania, hafnia, boria, natural or synthetic crystalline zeolite and diatomaceous earth.

In this invention the method for preparing the silica/alumina carrier is not particularly critical and may known methods can be adopted. For example, in this invention there can be adopted a method comprising mixing silica and alumina gels prepared respectively in advance; a method comprising immersing a silica gel in a solution of an aluminum compound and adding a suitable amount of a basic substance to thereby deposit the formed alumina gel on the silica gel; a method comprising adding an alkaline substance to a homogeneous solution containing a water-soluble silicon compound and a water-soluble aluminum compound to coprecipitate both of the components, and the like. In preparing a carrier suitable for the catalyst of this invention, it is preferred that ammonium carbonate be added as an aging agent when a silica/alumina hydrate formed by such methods as mentioned above is heated and aged.

It is not always easy to increase the proportion of pores having a diameter within a range of from 150 to 600 Å in a catalyst comprising a silica/alumina carrier. However, it has been discovered that this object can easily be accomplished effectively by such method using ammonium carbonate. More specifically, a carrier suitable for the catalyst of the instant invention can be prepared by a method comprising adding ammonium carbonate as an aging agent to a suspension of a colloidal sol or gel of a silica/alumina of a silica content of less than about 40% by weight (optionally along with other inorganic oxide as described supra), the amount of ammonium carbonate being such that from about 0.001 to about 5 moles of ammonium carbonate is present per about 0.1 to about 4 moles of the soluble aluminum salt, aging the sol or gel at a pH of 6 to 11, recovering the resulting precipitate by filtration, washing the precipitate and then molding it into a desired shape. As shown in comparative examples 3 and 4 described hereinafter, when a silica/alumina carrier is prepared without adopting the above aging method comprising the addition of ammonium carbonate or if a commercially available silica/alumina carrier is employed, a catalyst having the specific pore size distribution of this invention is difficult to obtain and hence, the high catalytic effect as intended in this invention cannot be achieved by such a catalyst.

Preparation of the hydrogenation catalyst of this invention is not limited to one prepared by the above-mentioned preparation methods, but may be prepared by any method capable of providing the pore size distribution of the instant invention.

The group VIII noble metal component used as the active hydrogenating component of this invention includes at least one member selected from the group consisting of palladium, platinum, rhodium, osmium, ruthenium and iridium supported on the carrier in the form of a metal or oxide thereof. In order to attain the objects of this invention effectively, a palladium component is most preferable among these noble metal components. Deposition of the noble metal component can be accomplished, for example, by a method comprising adding a solution of a noble metal compound to a solution of carrier-constituting soluble compounds to effect coprecipitation, a method comprising adding a solution of a noble metal compound to a gel of a carrier, and the like. In this invention, however, a preferred method comprises impregnating a carrier with a solution of a noble metal compound. For example, the intended catalyst can be obtained by impregnating a carrier, prepared in advance, with an acidic or basic solution of a palladium compound, separating the palladium compound-impregnated carrier from the solution, and then washing, drying and calcining the impregnated carrier.

As the palladium compound, there can be employed, for example, palladium chloride, palladium nitrate, palladium sulfate, potassium chloropalladate and sodium chloropalladate. Such compound is dissolved in hydrochloric acid, nitric acid or the like to form an acidic solution, or dissolved in ammonia, amine or the like to form a basic solution, with the so formed acidic or basic solution used for the impregnation treatment. The amount of the palladium-containing solution to be used for the impregnation treatment is not particularly critical, as long as a sufficient and effective contact can be attained between the carrier and the palladium compound. However, it is generally preferred that the volume of the palladium-containing solution be from about 1 to about 20 times the volume of the carrier. The concentration of palladium in the solution should be at least equal to the desired amount of palladium to be deposited, but may optionally be adusted to exceed this amount if desired. It is preferred that drying be carried out at a temperature ranging from room temperature to about 150° C., and calcination be carried out at a temperature ranging from about 150° to about 500° C. The noble metal component should be deposited in a catalytically effective amount, for example, about 0.1 to about 1% by weight as calculated as the metal. It is possible to incorporate in the so formed catalyst a small amount of a promoter such as thorium, cerium, lanthanum, other rare earth elements and the like. Incorporation of such a promoting component can preferably be accomplished by the impregnation treatment using a soluble compound of such component.

In general, reduction of the activity in a hydrogenation catalyst is mainly due to the deposition of coke. The catalyst of this invention can be regenerated very simply by burning off the deposited coke thereby restoring the high activity.

The hydrogenation catalyst of this invention is especially suitable for refining of hydrocarbon oils containing aromatic hydrocarbons. As the hydrocarbon oil, there can be used, for example, fractions obtained by atmospheric pressure distillation or reduced pressure distillation of crude oil. The hydrogenation catalyst of this invention is effective for removing aromatic hydrocarbons from light fractions, moreover, the catalyst is especially effective for removing aromatic hydrocarbons from heavy fractions, for example, raffinates formed by treating a lubricating oil fraction with a selective solvent for aromatic hydrocarbons (for example, phenol, furfural, cresol, sulfur dioxide, N-methyl-pyrrolidone, morpholine, dimethylformamide, sulforane and mixtures thereof). Further, the catalyst of this invention can remove substantially completely aromatic hydrocarbons left in lubricating oil fractions treated under hydrocracking conditions. Therefore, according to the hydrogenation using the catalyst of this invention, it is possible to prepare high quality jet fuels, kerosene, solvents, lubricating oils and the like. Further, liquid paraffins meeting the requirements specified by Japanese Industrial Standard and white oils surpassing standards specified by the Japanese Pharmacopoeia and EDA (U.S. Food and Drug Administration, 121, 1146) can also be prepared easily by using the hydrogenation catalyst of this invention.

In case it is intended to improve the quality of a jet fuel, it is preferred that hydrogenation be carried out under the following conditions:

Reaction temperature: about 200° to about 300° C.
Reaction pressure: about 20 to about 100 Kg/cm$^2$.
Liquid space velocity: about 0.5 to 5 V/H/V.
Hydrogen flow rate: about 50 to about 400 Nm$^3$/Kl.

If the hydrogenation is carried out under these conditions, products having a highly improved smoke point and excellent combustion characteristics can be obtained.

It is preferred that hydrogenation of lubricating oil fractions treated under hydrocracking conditions or lubricating oil fractions in which the aromatic hydrocarbon content is reduced (to less than about 10%, preferably about 5 to about 7%, as measured according to the n-d-m method) by extraction with a solvent such as phenol, furfural, N-methylpyrrolidone and the like be carried out under the following conditions:

Reaction temperature: about 200° to about 300° C.
Reaction pressure: about 50 to about 300 Kg/cm$^2$.
Liquid space velocity: about 0.2 to about 2 V/H/V.
Hydrogen flow rate: about 50 to about 400 Nm$^3$/Kl.

Aromatic hydrocarbons contained in such a lubricating oil fraction as mentioned above can be hydrogenated substantially completely by hydrogenation conducted under the above conditions and they are mainly converted to naphthenic hydrocarbons. Accordingly, a high quality lubricating oil having a low ultraviolet absorbance can be obtained. For example, ultraviolet absorption coefficients ($1 \cdot g^{-1} \cdot cm^{-1}$) of polycyclic aromatic compounds appearing at 279 m$\mu$ and 333 m$\mu$ are substantially zero in such product. This fact proves that polycyclic aromatic compounds, removal of which is very difficult by the conventional hydrogenation methods, can easily be removed by hydrogenation using the catalyst of this invention.

The photostability is also improved. For example, sludges are formed within three days in the case of a feed stock, but this sludge-forming period is prolonged to more than two weeks in the case of a hydrogenated oil formed by using the hydrogenation catalyst of this invention. The photostability is evaluated based on the number of days during which no sludge is formed when a sample oil is charged into a glass vessel and it is allowed to stand still in a bright place at room temperature.

In performing the hydrogenation of hydrocarbon oils, a dewaxing treatment may be carried out if needed. The dewaxing treatment can be conducted according to the solvent method, the adsorbing dewaxing method or the like. Further, the dewaxing treatment may be carried out after the hydrogenation.

In case a sulfur-containing oil is hydrogenated, the activity maintenance of the noble metal catalyst can be greatly improved, if desulfurization is carried out in advance by hydrodesulfurization or other method. As to the hydrodesulfurization, one method comprises contacting a feed stock with hydrogen at a temperature of about 150° to about 350° C., a pressure of about 50 to about 250 Kg/cm$^2$ and a liquid space velocity of about 0.3 to about 10 V/H/V in the presence of a catalyst comprising an oxide and/or sulfide of a metal selected from group VIII and group VI of the Periodic Table, supported on a refractory carrier such as alumina, alumina-silica, magnesia, silica and zirconia. However, since the catalyst of this invention has a very high resistance to sulfur poisoning, the desulfurization step can be omitted.

As detailed hereinbefore, the catalyst of this invention is characterized in that (1) the specific surface area is at least about 200 m$^2$/g, (2) pores having a diameter of smaller than 600 Å occupy at least 90% of the total pore volume, (3) pores having a diameter of 150 to 600 Å occupy at least 40% of the total pore volume of pores having a diameter of smaller than 600 Å and (4) the bulk density is at least about 0.6 g/ml. According to this invention, there is provided a hydrogenation catalyst capable of effectively removing aromatic compounds contained in a hydrocarbon oil and giving a high quality hydrocarbon oil. Further, since the hydrogenation catalyst of this invention has a very high resistance to sulfur poisoning, it can be used continuously for a long time and can easily be regenerated.

PREFERRED EMBODIMENT

This invention will be more apparent from the preferred embodiment described in the working examples set forth hereinbelow.

Determination of the Catalyst Pore Volume

The pore volume is determined according to the nitrogen adsorption method with respect to pores having a diameter of smaller than 600 Å, and is determined by the mercury porosimeter method [Catalytic Engineering Shokubai Kogaku Koza, Vol. 4, page 70 (published by Chijin Shokan (Japan) in 1964)] with respect to pores having a diameter larger than 600 Å.

In the nitrogen adsorption method, calculations are conducted according to the DH method [D. Dollimore and G. R. Heal, J. Appl. Chem., 14, 109 (1964)] and in the mercury porosimeter method calculations are conducted on the assumption that the contact angle of mercury to the catalyst is 140°, the surface tension is 480 dyne/cm and all the pores have a cylindrical shape.

The physical properties of the catalysts mentioned in the examples set forth hereinbelow were determined according to the following methods.

Pore Volume:

Nitrogen absorption method (pores having a diameter of smaller than 600 Å) and mercury porosimeter method (pores having a diameter larger than 600 Å).

The result of measurement of the pore volume differs sometimes depending on the shape or configuration of the pores.

Specific Surface Area:

Nitrogen absorption BET method.

Bulk Density:

The bulk density was determined by densely packing 300 ml of a sample into a 500 ml capacity cylinder and measuring the weight of the sample.

Side Crushing Strength:

The measurement was performed by using a Kiya-type hardness tester.

Ultraviolet absorption coefficient:

The measurement was conducted according to ASTM D-2008.

Photostability:

A sample was charged in a glass cylindrical vessel having an inner capacity of 100 ml, and it was allowed to stand still at room temperature in a bright place without sealing the vessel. The photostability was expressed in terms of the number of days during which no sludge was formed.

EXAMPLES 1 AND 2

4,935 g. of aluminum chloride were dissolved in 17,000 ml of distilled water, and a liquid mixture of 4,000 ml of 28% aqueous ammonia and 10,000 ml of distilled water was added to the solution under agitation. Then a solution formed by dissolving 610 g. of water glass No. 3 (Japanese Industrial Specification) in distilled water was added to the mixture.

14,000 ml of a 1 N aqueous solution of ammonium carbonate was added to 13,600 ml of the so formed suspension, and the mixture was maintained at 85° to 98° C. for six hours and cooled. Then, the mixture was maintained at room temperature for 24 hours. The resulting suspension was filtered and the recovered precipitate was washed with a solution of ammonium acetate. Then it was extrusion-molded into a cylindrical shape having a diameter of 1.5 mm. The so obtained carrier was impregnated in a basic aqueous solution of palladium chloride so that it supported 1.0% by weight of palladium. The resulting palladium-impregnated carrier was then dried in air at 120° C. and calcined at 360° C. to obtain catalyst A.

Catalyst B was prepared in the same manner as described above, except that the amount of palladium was 0.5% by weight.

Properties of the so obtained catalysts as shown in Table 1.

TABLE 1

|  | Example 1 (Catalyst A) | Example 2 (Catalyst B) |
| --- | --- | --- |
| Pore Volume (ml/g) | | |
| pores of diameter of 150 to 600 Å (A) | 0.5033 | 0.6054 |
| pores of a diameter smaller than 600 Å (B) | 0.8822 | 1.0103 |
| pores of a diameter larger than 600 Å (C) | 0.023 | 0.020 |
| [(A)/(B)] × 100 (%) | 57 | 60 |
| [(B)/(C + B)] × 100 (%) | 97 | 98 |
| Specific Surface Area (m²/g) | 327 | 340 |
| Bulk Density (g/ml) | 0.45 | 0.40 |
| Side Crushing Strength (Kg/mm) | 1.2 | 1.2 |
| Silica Content (% by weight) | 20 | 20 |
| Alumina Content (% by weight) | 80 | 80 |
| Amount of Palladium (% by weight) | 1.0 | 0.5 |

Both of the above catalysts (A and B) are included in the scope of this invention. More specifically, in the case of catalyst B, the majority of pores have a diameter of smaller than 600 Å and are concentrated in pores having a diameter within the range of from 150 to 600 Å. Catalyst A has a similar pore size distribution.

In order to evaluate maintenance of the catalytic activity, these catalysts were used to hydrogenate the following feed stock under the conditions mentioned hereinbelow.

Crude oil produced in the Middle East was subjected to distillation under reduced pressure to obtain a lubricating oil fraction which was then hydrocracked. The hydrocracked oil was subjected to distillation under reduced pressure and a fraction boiling at 350° to 490° C. (as calculated under atmospheric pressure) was collected. The oil was dewaxed at −30° C. at a solvent/oil volume ratio of 3/1, and the dewaxed oil was subjected to hydrofining under such conditions as a temperature of 300° C. a pressure of 25 Kg/cm², a space velocity of 1.0 V/H/V and a hydrogen flow rate of 90 Nm³/Kl, in the presence of a cobalt-molybdenum catalyst. This hydrofined oil was used as the feed stock to be hydrogenated. This feed stock had the following properties:

Specific gravity (15/4° C.): 0.8636
Viscosity (cSt) at 37.8° C.: 31.7
Ultraviolet absorption coefficient (1·g⁻¹·cm⁻¹): at 275–280 mμ: 1.007 at 330–350 mμ: 0.4146
Sulfur content (ppm): 4
Nitrogen content (ppm): <1

This feed stock was charged in a cylindrical reaction vessel and hydrogenation was carried out under the following conditions:

Reaction temperature: 260° C.
Reaction pressure: 90 Kg/cm²
Liquid space velocity: 0.5 V/H/V
Hydrogen flow rate: 350 Nm³/K As the hydrogenation process, there was adopted a flow-down method in which a fixed bed was employed and the feed stock passed downwardly from the top of the reaction vessel to the bottom.

Results of the hydrogenation conducted by using the catalysts A and B are shown in Table 2.

TABLE 2

| | Catalyst A | Catalyst B | Starting Oil |
| --- | --- | --- | --- |
| Ultraviolet Absorption Coefficient (1 · g⁻¹ · cm⁻¹): | | | |
| at 275– | | | |

TABLE 2-continued

|  | Catalyst A | Catalyst B | Starting Oil |
|---|---|---|---|
| 280 mμ | 0.00479 | 0.00853 | 1.007 |
| at 330– | | | |
| 350 mμ | 0.000197 | 0.00037 | 0.4146 |
| Photo-stability (days) | 32 | 20 | 2 |

EXAMPLE 3

A comparative catalyst C was prepared in the same manner as in Example 2 except that ammonium carbonate was not added and a comparative catalyst D was prepared in the same manner as in Example 2 except that a commercially available silica-alumina carrier (manufactured by Ketjen Chemical Co.) was employed. The activity of each catalyst was determined. Properties of these comparative catalysts are shown in Table 3 and results of evaluation of the activity are shown in Table 4.

TABLE 3

|  | Comparative Catalyst C | Comparative Catalyst D |
|---|---|---|
| Pore Volume (ml/g) | | |
| pores of a diameter of 150 to 600 A (A) | 0.3022 | 0.0855 |
| pores of a diameter of 0 to 600 A (B) | 0.7600 | 0.5514 |
| pores of a diameter larger than 600 A (C) | 0.167 | 0.063 |
| [(A)/(B)] × 100 (%) | 40 | 16 |
| [(B)/(C+B)] × 100 (%) | 82 | 90 |
| Specific Surface Area (m²/g) | 348 | 327 |
| Bulk Density (g/ml) | 0.45 | 0.58 |
| Side Crushing Strength (Kg/mm) | 0.26 | 0.88 |
| Silica Content (% by weight) | 19 | 18 |
| Alumina Content (% by weight) | 81 | 82 |
| Amount of Palladium (% by weight) | 0.5 | 0.5 |

TABLE 4

|  | Comparative Catalyst C | Comparative Catalyst D |
|---|---|---|
| Ultraviolet Absorption Coefficient $(l \cdot g^{-1} \cdot cm^{-1})$ | | |
| at 275–280 mμ | 0.01124 | 0.01965 |
| at 330–350 mμ | 0.00059 | 0.00074 |
| Photostability (days) | 17 | 10 |

As is apparent from the data shown above, each of the comparative catalysts, unlike the catalysts of Examples 1 and 2, has a pore size distribution outside the scope of this invention. In the comparative catalyst C, since pores having a diameter outside the range of 0 to 600 A are present in an amount of 18%, the mechanical strength is low and hence, this catalyst cannot be used industrially. In the comparative catalyst D, the pores having a diameter of 150 to 600 A occupy only 16% of the total pore volume of pores having a diameter of 0 to 600 A and this value does not reach the lower limit of 40% required for the catalyst of this invention. As is apparent from the foregoing data, each of these comparative catalysts is inferior to the catalysts of this invention with respect to catalytic activity.

EXAMPLE 4

Dibenzothiophene was added to the hydrogenated oil described in Examples 1 and 2, and the mixture was used as a feed stock for evaluation of the catalysts mentioned above. Dibenzothiophene was added in an amount of 0.035 g per one Kg of the feed stock. The same hydrogenation conditions as adopted in Examples 1 and 2 were employed. By this experiment, the resistance to sulfur poisoning was evaluated. From the results of this experiment, it is seen that the catalyst B of this invention was much superior to the comparative catalyst D with respect to the activity maintenance. The experimental results are shown in Table 5.

TABLE 5

|  | Catalyst B | Comparative Catalyst D |
|---|---|---|
| Ultraviolet Absorption Coefficient $(l \cdot ^{-1} \cdot cm^{-1})$ | | |
| at 275–280 mμ | 0.01268 | 0.03052 |
| at 330–350 mμ | 0.00058 | 0.00120 |
| Photostability (days) | 17 | 3 |

From the results of the above-mentioned Examples, it is apparent that the catalysts of this invention were much superior to the other catalysts with respect to the catalytic activity and the mechanical strength. Namely, it will readily be understood that the presence of pores having a diameter of 150 to 600 A is especially important for hydrogenation and pores having a diameter larger than 600 A are not effective for hydrogenation.

What is claimed is:

1. A process for hydrogenating aromatic compounds present in hydrocarbon oils comprising contacting said oil, at a temperature of from 200°–300° C., with hydrogen and a catalyst containing a catalytic metal or compound thereof comprising at least one noble metal component of Group VIII of the Periodic Table supported on a porous silica/alumina carrier having a specific surface area of at least about 200 m²/g and a bulk density of less than about 0.6 g/ml and wherein the silica content of the carrier ranges between about 5 to 40% by weight of the carrier and further characterized in that:
   (a) pores having a diameter smaller than 600 Å occupy at least 90% of the total pore volume, but less than 100% of the total pore volume;
   (b) pores having a diameter of from 150 to 600 Å occupy at least about 50% of the total volume of the pores having a diameter smaller than 600 Å; and
   (c) recovering an oil of reduced aromatic content.

2. The process of claim 1 wherein the catalyst is further characterized in that pores having a diameter of smaller than 600 Å occupy at least 95% of the total pore volume and wherein pores having a diameter of from 150 to 600 Å occupy from about 50 to about 80% of the total volume of the pores having a diameter smaller than 600 Å.

3. The process of claim 2 wherein the catalyst contains at least one metal or an oxide of a metal selected from the group consisting of palladium, platinum, rhodium, osmium, ruthenium and iridium.

4. The process of claim 3 wherein the catalytic metal is palladium or an oxide thereof.

5. The process of claim 3 wherein said hydrocarbon oil is a vacuum distillate, a residue, a reduced crude, a solvent extracted lube oil raffinate, a jet fuel base, a white oil stock, or mixtures thereof.

6. The process of claim 3 wherein said catalyst contains a small amount of a promoter selected from the group consisting of rare earth elements and mixtures thereof.

7. The process of claim 5 wherein the hydrogenation is conducted at a pressure ranging from about 20 to 300 kilograms per square centimeter, a liquid space velocity ranging from about 0.2 to about 5 V/H/V and a hydrogen flow rate of from 50 to 400 Nm$^3$/Kl.

8. The process of claim 7 wherein the carrier contains between about 1 and 10 wt.% of an additive, based on the weight of the carrier, selected from the group consisting of magnesia, zirconia, titania, hafnia, boria, natural and synthetic crystalline zeolites, diatomaceous earth and mixtures thereof.

* * * * *